United States Patent
Yokoyama et al.

[11] Patent Number: 5,983,171
[45] Date of Patent: Nov. 9, 1999

[54] AUTO-INDEX METHOD FOR ELECTRONIC DOCUMENT FILES AND RECORDING MEDIUM UTILIZING A WORD/PHRASE ANALYTICAL PROGRAM

[75] Inventors: Yooichi Yokoyama, Ebina; Miho Matsushita, Fujisawa; Yuuji Ootani, Hiratsuka; Noriaki Yokoyama, Yokohama, all of Japan

[73] Assignee: Hitachi, Ltd., Tokyo, Japan

[21] Appl. No.: 08/778,096

[22] Filed: Jan. 2, 1997

[30] Foreign Application Priority Data

Jan. 11, 1996 [JP] Japan .................................. 8-003022

[51] Int. Cl.⁶ .................................. G06F 15/38
[52] U.S. Cl. .................................. 704/10; 704/9
[58] Field of Search .................. 704/1, 7, 9–10; 707/100, 102, 530, 531

[56] References Cited

U.S. PATENT DOCUMENTS

| | | | |
|---|---|---|---|
| 4,965,763 | 10/1990 | Zamora | 704/9 |
| 5,077,668 | 12/1991 | Doi | 704/9 |
| 5,257,186 | 10/1993 | Ukita et al. | 704/1 |
| 5,276,616 | 1/1994 | Kuga et al. | 704/9 |
| 5,384,703 | 1/1995 | Withgott | 704/9 |
| 5,642,518 | 6/1997 | Kiyama et al. | 704/9 |
| 5,752,051 | 5/1998 | Cohen | 704/9 |

FOREIGN PATENT DOCUMENTS

| | | | |
|---|---|---|---|
| 0423683A3 | 4/1991 | European Pat. Off. | |
| 61-75952 | 4/1986 | Japan | G06F 7/28 |
| 62-154025 | 7/1987 | Japan | G06F 15/20 |
| 63-70372 | 3/1988 | Japan | |
| 1-304574 | 12/1989 | Japan | G06F 7/28 |
| 3-132872 | 6/1991 | Japan | G06F 15/20 |
| 6-348695 | 12/1994 | Japan | G06F 15/20 |

*Primary Examiner*—Forester W. Isen
*Assistant Examiner*—Patrick N. Edouard
*Attorney, Agent, or Firm*—Antonelli, Terry, Stout & Kraus, LLP

[57] ABSTRACT

An auto-index method enabling to select words used for heading of an index based on an indexing object extraction condition set by a user. In order to generate an index intended for electronic document files, words and phrases are extracted from document files that may become an object for creating an index, the positions of words and phrases on an electronic publication at the time of extracting are extracted, an indexing object extraction condition inputted by a user is received and extracted words and phrases and the indexing object extraction condition are compared with each other to thereby extract index objective words and phrases.

6 Claims, 14 Drawing Sheets

| ITEM NO. | WORD NAME | REA-DING | DOCUMENT INFORMATION ||||||| POSITIONAL INFORMATION ||| INFORMATION BY WORDS AND PHRASES |||
|---|---|---|---|---|---|---|---|---|---|---|---|---|---|---|
| | | | AT TIME OF REGIST-RATION | DOCUMENT NAME 1 | WRITER NAME | BY GROUP | PUBLISHING COMPANY | FINAL TIME 2 | PAGE | LINE | NUMBER OF WORD | CLASSIFIED BY COUNTRY 3 | CHARA-CTER TYPE | PART OF SPEECH | NUMBER OF APPE-ARANCE |
| 1 | | | | | | | | | | | | | | | |
| 2 | | | | | | | | | | | | | | | |
| 3 | | | | | | | | | | | | | | | |

1 DOCUMENT NAME : DESIGNATION OF DOCUMENT NAME AND DOCUMENT ID/FILE NAME APPROVED

2 FINAL : FINAL UTILIZATION DATE

3 CLASSIFIED BY COUNTRY : LANGUAGE CLASSIFIED BY COUNTRY

| DOCUMENT INFORMATION ||||||
|---|---|---|---|---|---|
| AT TIME OF REGISTRATION | DOCUMENT NAME | WRITER NAME | CLASSIFIED BY GROUP | PUBLISHING COMPANY | FINAL TIME |
|  |  |  |  |  |  |

| ITEM NO. | WORD NAME | READING | PART OF SPEECH |
|---|---|---|---|
| 1 |  |  |  |
| 2 |  |  |  |
| 3 |  |  |  |

FIG. 10

| ITEM NO. | WORD NAME | REA- DING | DOCUMENT INFORMATION ||||||| POSITIONAL INFORMATION ||| INFORMATION CLASSIFIED BY WORDS AND PHRASES ||||
|---|---|---|---|---|---|---|---|---|---|---|---|---|---|---|---|
| | | | AT TIME OF REGIST- RATION | DOCUMENT NAME 1 | WRITER NAME | CLASSI- FIED BY GROUP | PUBLISHING COMPANY | FINAL TIME | PAGE | LINE | NUMBER OF WORD | CLASSIFIED BY COUNTRY 3 | CHARA- CTER TYPE | PART OF SPEECH | NUMBER OF APPE- ARANCE |
| 1 | | | | | | | | | | | | | | | |
| 2 | | | | | | | | | | | | | | | |
| 3 | | | | | | | | | | | | | | | |

FIG. 11

| ITEM NO. | WORD NAME | REA-DING | DOCUMENT INFORMATION ||||||| INFORMATION CLASSIFIED BY WORDS AND PHRASES ||||
| | | | AT TIME OF REGIST-RATION | DOCUMENT NAME | WRITER NAME | CLASSI-FIED BY GROUP | PUBLISHING COMPANY | LAST TIME | CLASSIFIED BY COUNTRY | CHARA-CTER TYPE | PART OF SPEECH | NUMBER OF APPE-ARANCE |
| 1 | | | | | | | | | | | | |

FIG. 12

| ITEM NO. | WORD NAME | REA- DING | DOCUMENT INFORMATION ||||| POSITIONAL INFORMATION || INFORMATION BY CLASSIFIED WORDS AND PHRASES ||||
| --- | --- | --- | --- | --- | --- | --- | --- | --- | --- | --- | --- | --- | --- |
| | | | AT TIME OF REGIST- RATION | DOCUMENT NAME 1 | WRITER NAME | CLASSI- FIED BY GROUP | PUBLISHING COMPANY | LAST TIME | PAGE | LINE | NUMBER OF WORD | CLASSIFIED BY COUNTRY | CHARA- CTER TYPE | PART OF SPEECH | NUMBER OF APPE- ARANCE |
| 1 | | | | | | | | | | | | | | | |
| 2 | | | | | | | | | | | | | | | |
| 3 | | | | | | | | | | | | | | | |

| ITEM NO | DOCUMENT NAME | MERGE DESIGNATION |
|---------|---------------|-------------------|
| 1       |               |                   |
| 2       |               |                   |

| DISPLAY ITEM 4 | CLASSIFIED BY DOCUMENT | SORT SEQUENCE | CLASSIFIED BY OUTPUT FORMAT |
|----------------|------------------------|---------------|------------------------------|
|                |                        |               |                              |
|                |                        |               |                              |

4 DISPLAY ITEM : PLURAL DESIGNATION OF ONLY DISPLAY ITEMS APPROVED AMONG FORMATS OF DISPLAY FORMATS

FIG. 16

INDEX DOCUMENT A OR DOCUMENT B

| a | ARCHITECTURE | DOCUMENT A  p15,23 | DOCUMENT B  p852 | wa

A

Z

AUTO-INDEX METHOD FOR ELECTRONIC DOCUMENT FILES AND RECORDING MEDIUM UTILIZING A WORD/PHRASE ANALYTICAL PROGRAM

BACKGROUND OF THE INVENTION

The present invention relates to an auto-index method intended for electronic publications, i.e., general document files as contents and a method of utilizing the same.

In general prior art, when words and phrases that become candidates for an index are included in the text of electronic publications, a compiling operator designates words and phrases of respective index candidates to thereby compile an index. As a method of compiling an index by designating words and phrases of index candidates, there are two ways for example, as follows.

A first indexing method includes compiling an index, when words and phrases of respective index candidates are registered in an index candidate dictionary, by extracting index locations at the same time. A second indexing method includes compiling an index by retrieving a word in the dictionary again and extracting the location of the retrieved and obtained word.

One of the indexing methods of this type has been disclosed in JP-A-62-154025 for instance. In this prior art, is indicated whether the word is to be registered in an index or not, when Japanese characters "hirakana" are converted into a word or phrase combined with Chinese characters "kanji" at time of composing a document or sentence. This is an operation peculiar to a Japanese word processor. In the case of an English word processor for instance, this operation corresponds to a technique of inputting several words and performing conversion to replace these words with other words.

In this prior art, however, since indication of index registration is performed by a user operation, the workload of an index compiler (User) becomes heavy when the number of registration words is large.

Further, JP-A-61-75952 discloses a technique for retrieving a required document file from a plurality of document files using keywords extracted from the respective document files. Those words that are inputted frequently are selected and extracted while sentences are being inputted. Then, the extracted word and a similar word thereof are made into a set, which is handled as a keyword and stored in the file. According to this method, all of the extracted words and phrases are related to documents as keywords and stored in the file. In this prior art, however, the words and phrases to which an index is actually compiled are not selected.

As described above, a method appropriate for compiling an index has not been known in either technique. There has been such a problem that an efficient method requires a heavy workload. Further, although indexing of electronic document files has been made in the prior art, no consideration has been given to a method of outputting documents using the indexing, i.e., a method of utilizing a compiled index.

SUMMARY OF THE INVENTION

It is an object of the present invention to provide an auto-index method that solves the above-mentioned problems of prior art and selects words used in heading of indexes and a method of utilizing the same.

The above-mentioned object of the present invention may be achieved by providing a structure described hereunder.

According to one feature of the present invention there is provided an automatic indexing method intended for electronic document files, which comprises the steps of: automatically extracting words and phrases using a word or phrase analysis program; extracting the positions of words and phrases on electronic publications at the time of the word or phrase extracting; receiving an indexing object extraction condition inputted by a user where the objects define objective words and/or phrases; registering words and phrases relevant to the indexing object extraction condition among words and phrases that have been extracted previously, into an index candidate dictionary; and compiling an index using the index candidate dictionary in which words have been registered.

The method according to another feature of the present invention further comprises the step of designating the indexes as compiled above to thereby output relevant pages in the electronic document files.

Still further advantages of the present invention will become apparent to those of ordinary skill in the art upon reading and understanding the following detailed description of the preferred and alternate embodiments.

BRIEF DESCRIPTION OF THE DRAWINGS

The invention will be described in conjunction with certain drawings which are for the purpose of illustrating the preferred and alternate embodiments of the invention only, and not for the purpose of limiting the same, and wherein:

FIG. 7 is a diagram showing an example of a format of a tokened word and phrase file according to an embodiment of the present invention;

FIG. 10 is a diagram showing an example of a format of a candidate file according to an embodiment of the present invention;

FIG. 11 is a diagram showing an example of a format of an indexing object extraction condition according to an embodiment of the present invention;

FIG. 12 is a diagram showing an example of a format of an index file according to an embodiment of the present invention;

FIG. 16 is a diagram showing an example of a display format of document combined index according to an embodiment of the present invention.

DESCRIPTION OF THE PREFERRED EMBODIMENTS

In an auto-index method according to the present invention, electronic files that already exist are tokened first. Here, the term "token" means words and phrases extracted from documents by token analysis, syntax analysis and so on, and "tokening" indicates steps of this procedure. Namely, in tokening as mentioned above, automatic extracting of words is performed by reading a document or sentence and punctuating them at every paragraph and resolving the paragraph at every word. Next, those words that are used in the heading of the index are selected out of the words based on an indexing object extraction condition set by the user. Then, the workload in extraction becomes less than in the past by selecting indexing candidate words out of those words that are used for the heading of the index based on the indexing object extraction condition designated and inputted by a user. With this, it is possible to proceed with the operations quickly when the words that become the index are extracted from the candidate words.

Further, it becomes possible to generate an index in accordance with the needs of an individual user whereby the user designates the indexing object extraction condition. Furthermore, it can be realized easily to generate the index again. By applying an auto-index method according to the present invention to a plurality of documents, it becomes possible to generate the index extending over a wide range. Furthermore, by referring to existing indexes, it becomes possible to create an index of new words only or an index in which new words are emphasized, and a user can retrieve newly added words and phrases quickly.

An embodiment of the present invention will be described in more detail hereinafter with reference to the drawings.

First, a summary of an embodiment of the present invention will be described.

Figure 1:
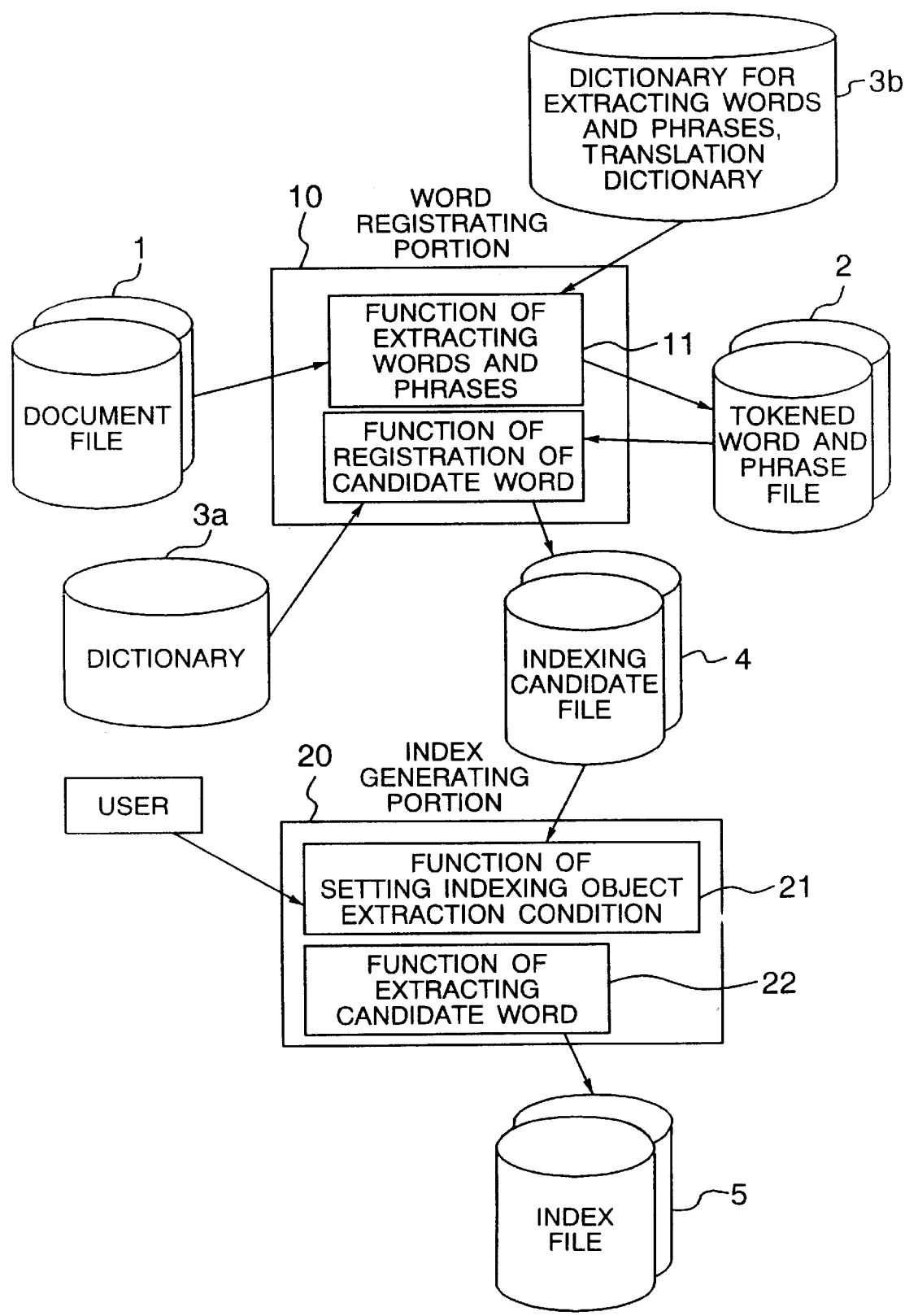
FIG. 1 is a block diagram showing an outline of a structure of an auto-index system according to an embodiment of the present invention.
Figure 2:
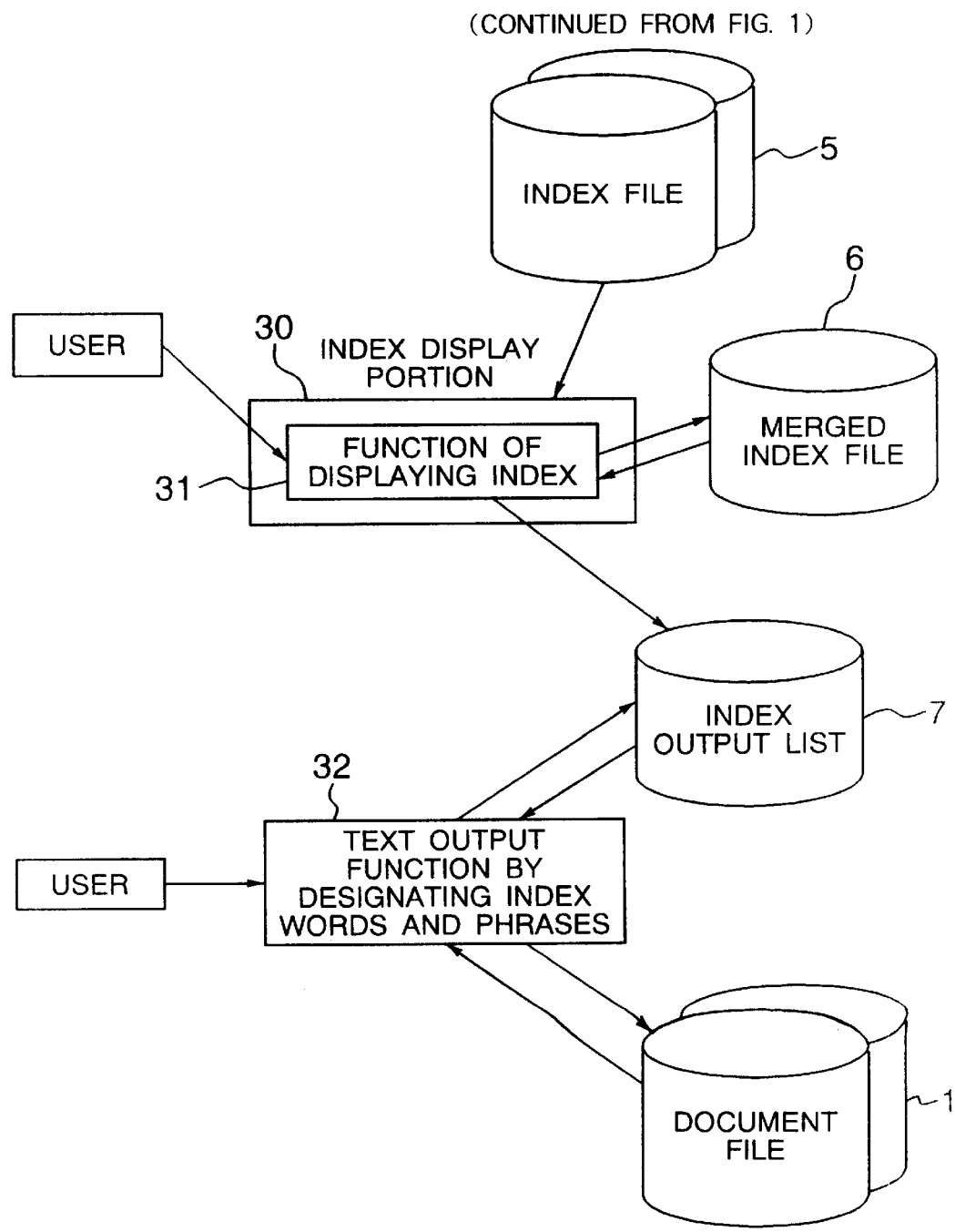
FIG. 2 is a block diagram showing an outline of a structure of an auto-index system according to an embodiment of the present invention.

FIG. 1 and FIG. 2 show a whole structure of an auto-index system according to an embodiment of the present invention. As shown in respective diagrams, the auto-index system according to the present invention is composed of a word registration portion 10 for reading contents of document files 1, extracting words and phrases and tokening them, and registering the words and phrases in indexing candidate files 4 after collating with a dictionary 3a, an index generating portion 20 for setting an indexing object extraction condition inputted by a user and registering words and phrases selected based on this condition in index files 5, and an index display portion 30 performing display adapted to display conditions from a plurality of index files 5.

Namely, in the auto-index system according to the present embodiment, indexing candidate files 4 are created from document files 1 processed by the word registration portion 10, index files 5 are created further by the index generating portion 20 based on the indexing object extraction condition, and display generated by the index display portion 30 is outputted.

First, candidate words are registered in the word registration portion 10 with respect to the electronic document files 1. The electronic document files 1 are subjected to word extraction automatically by means of token parser (analytical function) having a function 11 of extracting words and phrases, and the electronic document files 1 are then tokened. Here, information classified by document, information classified by words and phrases and positional information required as comparison conditions in extraction are set at every word. The information is stored in tokened word and phrase files 2 and collated with the dictionary 3a. The collated words and phrases are stored in the candidate files 4 together with these informations by a registration function of candidate words 12.

Next, in the index generating portion 20, the condition inputted by a user is set by a set function of the indexing object extraction condition 21. Then, words and phrases in the candidate files 4 are taken out by an extraction function of candidate words 22 and respective information items of words and phrases are compared with a set condition, thus extracting words to be indexed. The extracted words and the information thereof are registered in the index files 5.

In the index display portion 30, a plurality of index files 5 are merged first and a merged index file 6 is created by an index display function 31. Then, an index output list is composed adapting to an output designation condition by a user, and the index is displayed and outputted.

Respective parts constituting an auto-index system according to the present embodiment will be described in detail hereinafter.

Figure 3:
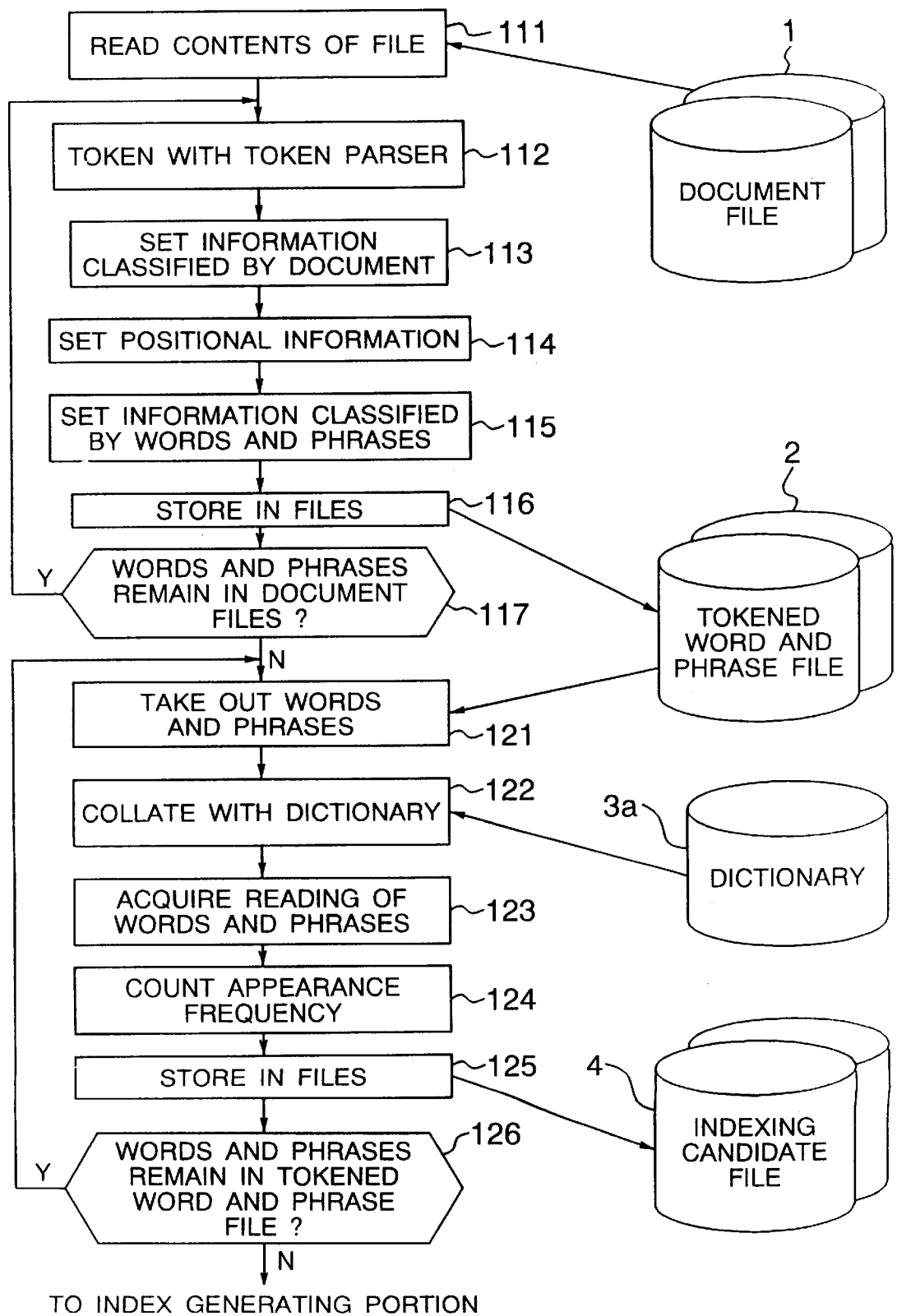
FIG. 3 is a flow chart related to a word registration portion according to an embodiment of the present invention.

First, a flow chart related to processing by the word registration portion 10 for extracting words from electronic files 1 using a dictionary for extracting words and phrases, a dictionary for translation or the like 3b and registering candidate words is shown in FIG. 3.

First, the contents of files are read from the document files 1 (a step 111). The contents thereof are tokened by a token parser (a step 112). The format of respective information that can be included in the tokened words and phrases is shown in FIG. 7. As shown in FIG. 7, the tokened words and phrases can include reading of words, information classified by document (a plurality of items allowed), positional information (a plurality of items allowed), information classified by words and phrases and so on.

Figures 8, 9:
FIG. 8 is a diagram showing an example of a format of a document file according to an embodiment of the present invention.
FIG. 9 is a diagram showing an example of a format of a dictionary according to an embodiment of the present invention.

The document files 1 include information classified by document such as registration time of documents, a document name or document ID/document file name, writer's name of documents, publisher or publishing companies of documents, and final time of utilization of documents in accordance with such a format as shown in FIG. 8. Further, simultaneously with extracting of words described previously, the information classified by document is acquired from the documents, and the contents thereof are set in accordance with the format shown in FIG. 7 (a step 113). Besides, this step 113 and the above-mentioned step 112 may be reversed in order.

Next, the positional information in the electronic document files 1 are extracted concerning respective words and phrases (a step 114). The positional information includes information related to the position where words and phrases have been extracted, and is composed of the number of words which indicates the number of lines in a page and the number of words in the line.

Further, as to words and phrases, the information classified by words and phrases such as language classified by country showing in which country it is used, character classification showing which of "kanji" and "kana" mixture, alphanumeric character, special character and mixture thereof the character constituting the word belongs to, and a part of speech of word is acquired in the token parser (a step 115). The order of this step 115 and the above-described step 114 may also be reversed.

Then, these information items are stored in the tokened word and phrase files 2 together with words in accordance with the format of tokened words and phrases shown in FIG. 7 (a step 116).

It is decided whether words and phrases still remain in the document files 1 (a step 117), and when they remain therein, the steps 112 to 116 are repeated.

Next, words and phrases in the tokened word and phrase files 2 are taken out (a step 121), and are collated with the dictionary 3a with words and phrases and a part of speech as keys. The words in the dictionary 3a have reading of words and a part of speech of words for every word in accordance with a format shown in FIG. 9.

Among respective information items of tokened words and phrases shown in FIG. 7, names of words and phrases and parts of speech are compared with those of respective words and phrases in the dictionary 3a. By collation with the dictionary 3a (a step 122), reading of words and phrases is acquired (a step 123) and the number of appearance times of the same word and phrase is counted (a step 124), which are stored in the candidate files 4 together with respective information items in accordance with a format shown in FIG. 10 (a step 125).

The format of the candidate files shown in FIG. 10 is the same as the format of the tokened word and phrase files shown in FIG. 7, and includes reading of words, information classified by document, positional information and information classified by words and phrases for every stored word. Here, what differs from the format of the tokened word and phrase files 2 is that the positional information can include a plurality of information items for one word.

Thereafter, it is decided whether words and phrases still remain in the tokened word and phrase files 2 or not (a step 126), and, when words and phrases remain therein, the processing in the steps 121 to 125 is performed repeatedly.

When there are a plurality of document files 1, candidate files 4 corresponding to respective document files 1 are generated similarly, and are merged in the following index generating portion 20, thus creating one index file 5.

Figure 4:
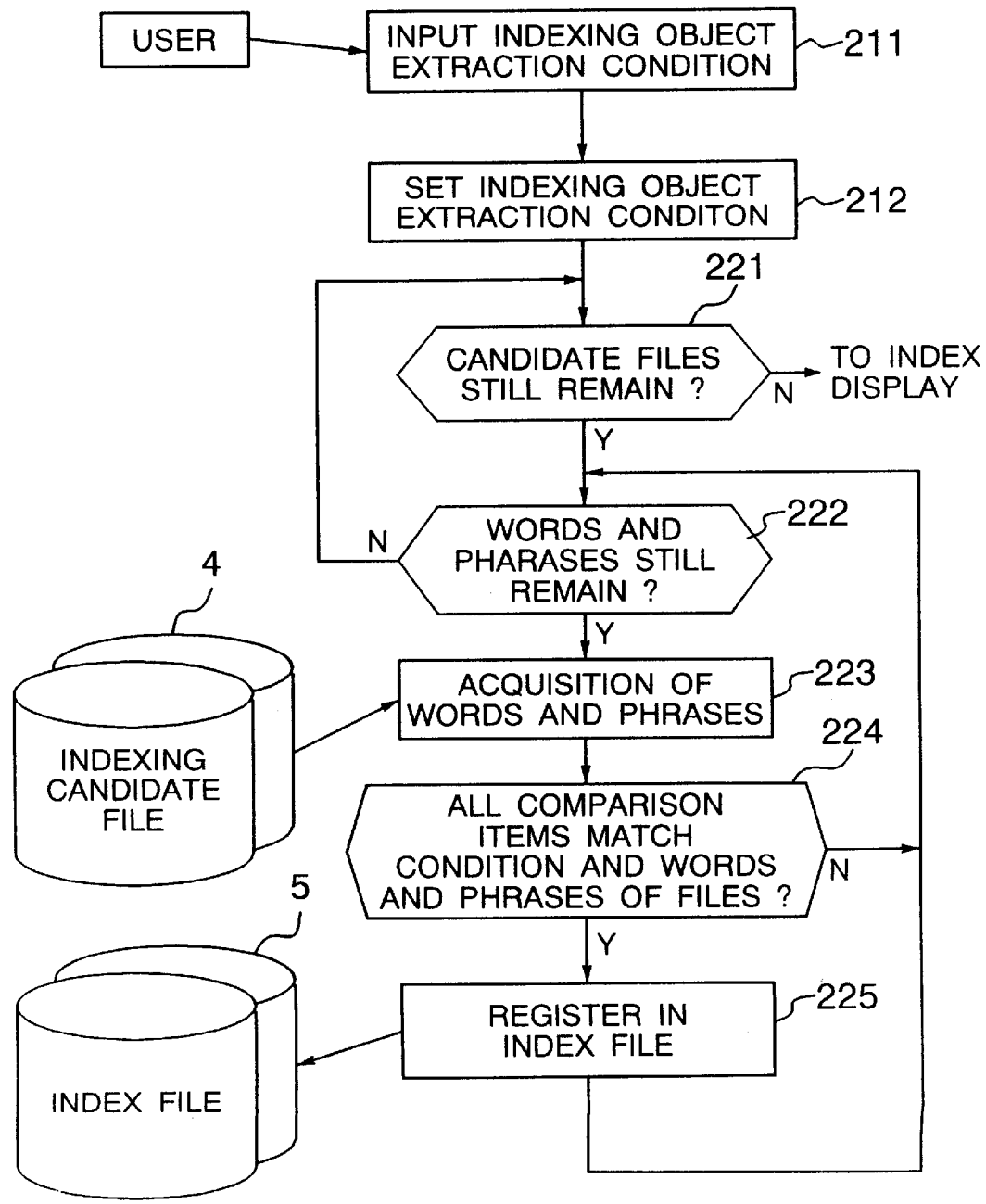
FIG. 4 is a flow chart related to an index generating portion according to an embodiment of the present invention.

Next, a flow chart related to processing of the index generating portion 20 for creating the index 5 using the candidate files 4 is shown in FIG. 4. It is determined whether the words and phrases extracted as index candidates are to be stored in the index files 5 or not depending on an indexing object extraction condition designated by a user. Here, the designated indexing object extraction condition (a step 211) is given to the index generating portion 20 in accordance with a format shown in FIG. 11 (a step 212). Either a system that a user inputs directly or a system that a user selects among combinations prepared in advance may be adopted as the indexing object extraction condition.

The indexing object extraction conditions are determined to be 12 types as described hereunder.
(1) Word (words in the a series (Japanese), word having the first letter A, . . . )
(2) Classified by registration period (designated date and thereafter, designated date and therebefore)
(3) Objective document name (document 1, document 2, . . . )
(4) Objective document ID/file name (file 1, file 2, . . . )
(5) Classified by writer
(6) Classified by group (every specialty field)
(7) Classified by publishing company, publisher
(8) Last utilization time (those utilized on designated date and therebefore and thereafter)
(9) Language classification (Japanese, English and other languages)
(10) Character classification (alphanumeric, kanji-kana combination, symbol, combination)
(11) Part of speech (verb, noun, adjective, . . . )
(12) Appearance frequency (words that appeared more frequently than designated threshold value are approved)

When Japanese is selected in the (9) language classification for instance, the condition (9) shows that "a word using Japanese as language". Further, as to the designation of the condition (3) objective document and the condition (4) objective document ID/file name, it is also possible to designate a plurality of documents or a plurality of files.

Next, it is confirmed whether the candidate files 4 to be read still remain or not (a step 221). When the files 4 still remain, it is confirmed whether there are any words and phrases that have not been read in the candidate files 4 (a step 222). When any words and phrases still remain, acquisition of words and phrases is made (a step 223).

Here, the contents of items related to words and phrases extracted from the candidate files 4 are compared with the contents of items of the set indexing object extraction condition (a step 224), to thereby select the words and phrases.

In comparison of conditions, only the items designated by a user are adopted as the object of comparison among respective items of the indexing object extraction condition. Those words and phrases that match each other with respect to all of the conditions to be compared are selected as words and phrases carried in the index, and are registered in the index files 5 in accordance with a format shown in FIG. 12 (a step 225). Those words and phrases in which even one condition shows mismatch are not registered in the index files 5.

When it has been determined whether words and phrases are registered or not registered (a step 225), the steps of procedure from confirmation of existence of the next word and phrase (the step 222) are repeated. Here, the index files 5 in which the information related to the word is designated has the same format as the tokened word and phrase file 2 shown in FIG. 7 and the candidate file 4 shown in FIG. 10 as shown in FIG. 12. What differs from the format described previously is the fact that it is possible to designate a plurality of document names or document ID/file names among the information classified by document showing the documents intended for indexing.

When those words and phrases that are to be read in the candidate files 4 are exhausted in the confirmation of existence of words and phrases (the step 222), the step is returned to the confirmation of existence of the candidate files 4 (the step 221), and the steps of procedure described above are repeated. Besides, when the candidate files 4 to be read are already gone in the confirmation of existence of the candidate files 4 (the step 221), generation of the index files 5 is completed.

Next, an index display portion 30 that is able to display a summary of the words registered in the index files 5 together with respective information items in accordance with a display format designated by a user will be described with reference to flow charts shown in FIG. 5 and FIG. 6.

First, the contents of the index files 5 are displayed (a step 311). At this time, it is confirmed with a user whether there is any part that the user desires to correct among the information items related to words and phrases (a step 312). If any correction is required, correction is made (a step 313).

Figure 13:
FIG. 13 is a diagram showing an example of a format of output designation according to an embodiment of the present invention.

Next, the name or the ID of the index file desired to be displayed and outputted that are designated by a user is set in accordance with a format shown in FIG. 13 (a step 314). When a plurality of files are designated in designation of the output, it is also set in a point whether it is required to merge the contents of these files or not. Then, the existence of the necessity of merging existing index files is decided by referring to the column of merge designation (a step 315). In case it is required to merge the index files, the index files 5 of respective documents are merged in accordance with the designation, thus generating new merged index files 6 (a step 316).

Figure 14:
FIG. 14 is a diagram showing an example of a format of a display format according to an embodiment of the present invention.

Next, the display condition designated by a user is set in accordance with a format shown in FIG. 14 (a step 317). The output format that can be designated by the display condition includes four types of display items, display format classified by document, sort sequence and display output format as shown in FIG. 14. In the display item, those items that are outputted together with the word name are selected among the information items included in respective words. In the display item, designation of a plurality of items is approved. In the display format classified by document, either an independent document index of respective plurality of documents or a document combined index in which information items of a plurality of documents are merged is selected.

Figure 15:
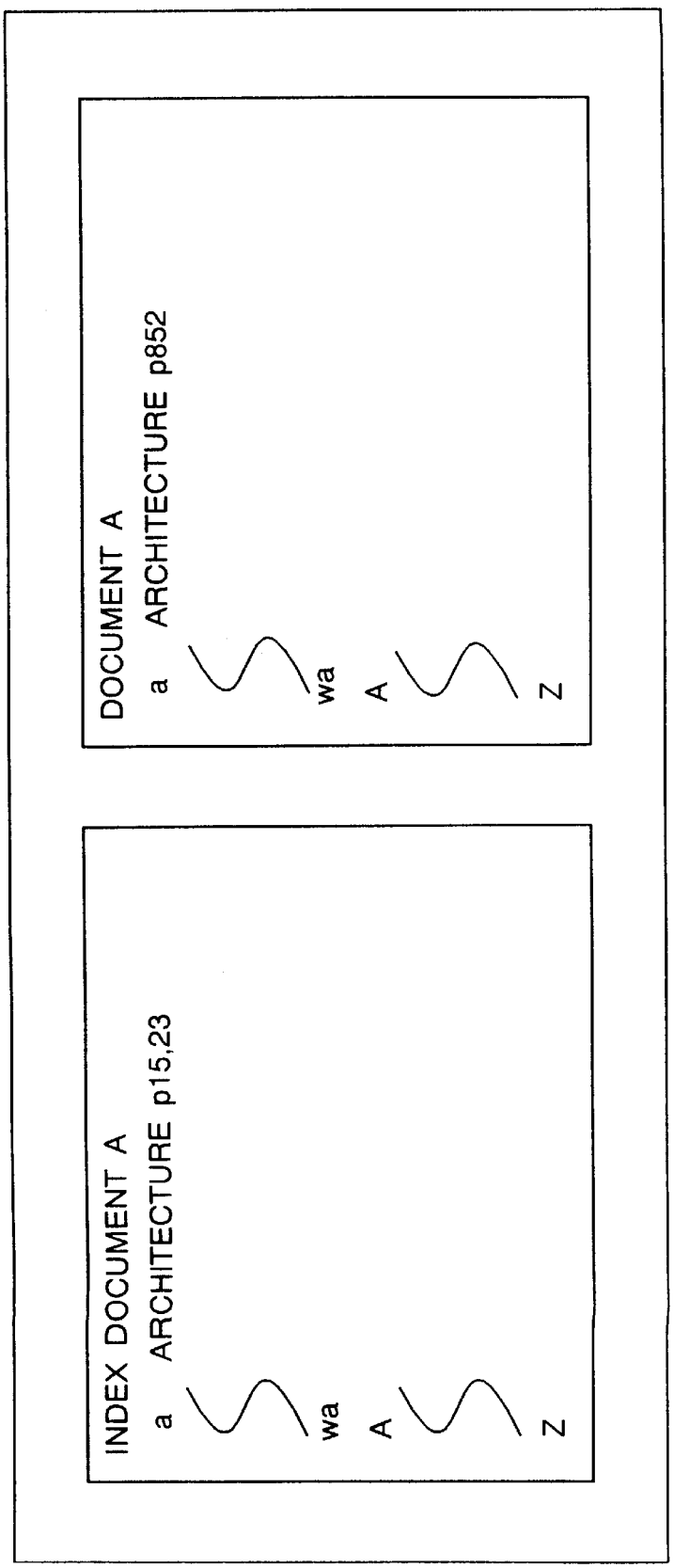
FIG. 15 is a diagram showing an example of a display format of an independent document index according to an embodiment of the present invention.

As the output when an index is generated from two documents, an example of display format for independent document index is shown in FIG. 15, and the same for document combined index is shown in FIG. 16. In the sort sequence, items that become the keys in sorting respective information items stored in the files in the sequence of registration are shown.

Here, any of the registration sequence, character code sequence, reading sequence for every character classification and reading sequence without distinction of character classification is selected. The display output format selects whether the output destination is determined to be a file or the output is shown on the display screen. The contents of the designated index files 5 or the merged index files 6 are sorted so as to generate an output list 7, and are outputted and displayed in accordance with the conditions designated by the user (a step 318).

Furthermore, in a text output function 32 according to indexed word and phrase designation, displayed indexed words and phrases are designated (simultaneous designation of the plural number is also approved), and the text corresponding thereto (pertinent page of the document file) is outputted and displayed (a step 319).

Although the workload has been heretofore heavy since words and phrases for indexing have been designated individually out of the words and phrases of the objective document as described above, according to the above-mentioned embodiment, the present invention has an advantage in that the generating of the index is reduced by a large margin since index objective words and phrases are automatically extracted conditionally. The above-mentioned embodiment shows only an example of the present invention and the present invention shall not be limited thereto.

Figure 5:
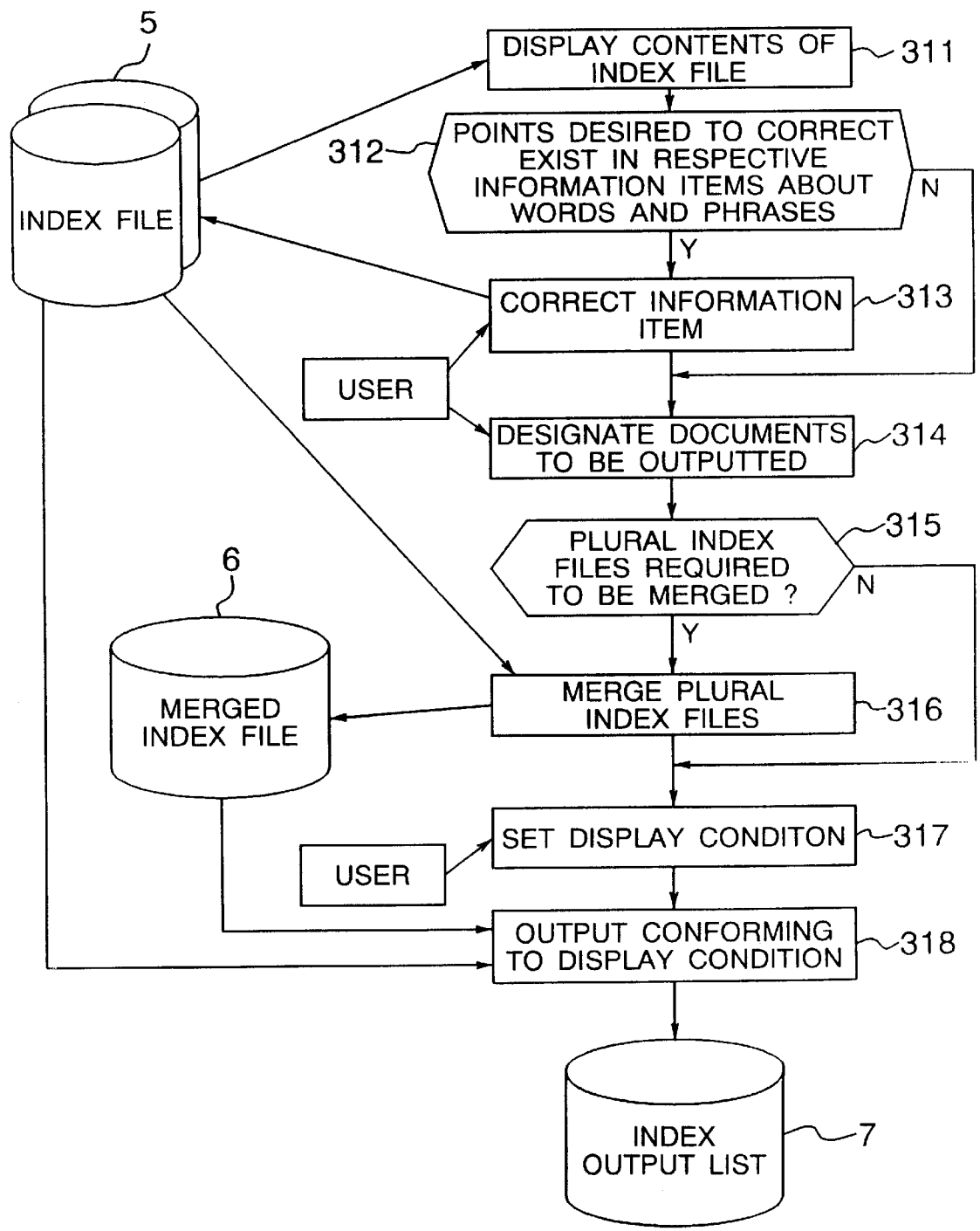
FIG. 5 is a flow chart related to an index display portion according to an embodiment of the present invention.
Figure 6:
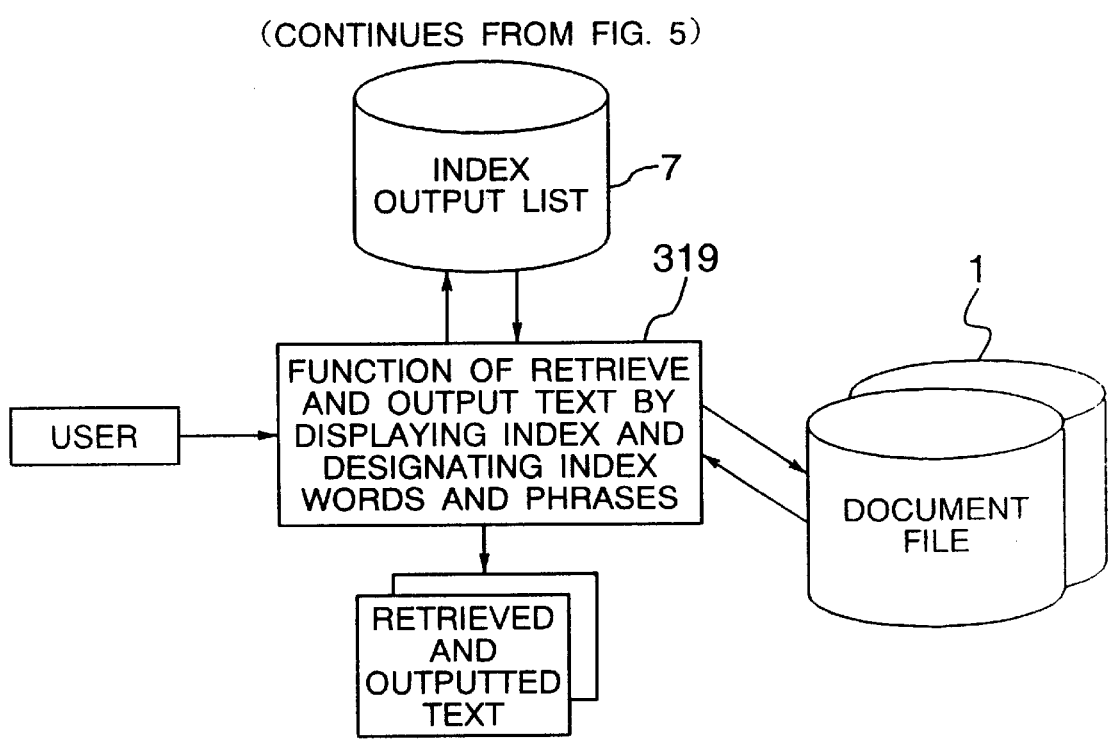
FIG. 6 is a flow chart related to an index display portion according to an embodiment of the present invention.

Programs implementing the functions embodied in the flow charts of FIGS. 3 to 5 may be stored singly or in combination in a recording medium or media such as a disk, magnetic tape and a semiconductor memory.

As described in detail above, according to the present invention, such remarkable effects that an auto-index method that enables selection of the words used for headings of the index based on the indexing object extraction condition set by a user and a method of effectively utilizing indexes created by the auto-index method can be realized are produced.

More specifically, while the conventional indexes have been generated by the generating side of documents and publications, it becomes possible, according to the present invention, for the user side to index only the words desired to look at easily adapting to individual utilization object. A user has been heretofore handling a plurality of documents while referring to indexes dispersed in every document, but it becomes possible to generate and utilize original indexes by combining a plurality of files freely in accordance with the present invention.

We claim:

1. An auto-index method intended for electronic document files, comprising the steps of:

extracting words and phrases from an electronic publication automatically in accordance with a token analytical program;

extracting the positions of words and phrases on said electronic publication at the time of the extracting by said word and phrase extracting step;

receiving an indexing object extraction condition inputted by a user; and registering words and phrases relevant to said indexing object extraction condition among said extracted words and phrases in an index candidate dictionary.

2. An auto-index method intended for electronic document files according to claim 1, wherein said indexing object extraction condition includes at least a reading of words and phrases and an occurrence frequency of the words and phrases.

3. An auto-index method intended for electronic document files according to claim 1, wherein a plurality of documents are objects to be indexed and all of corresponding positions in said plurality of documents are extracted with respect to the same words and phrases.

4. An auto-index method intended for electronic document files, comprising the steps of:

extracting words and phrases from an electronic publication automatically in accordance with a token analytical program;

extracting the positions of words and phrases on said electronic publication at the time of the extracting by said words and phrases extracting step;

registering said extracted words and phrases and said extracted positional information in an index candidate dictionary while correlating one with another;

holding an indexing object extraction condition defined by a user; and extracting words and phrases relevant to said indexing object extraction condition out of words and phrases registered in said index candidate dictionary.

5. A computer-readable recording medium for implementing automatically indexing for electronic document files, comprising:

program means for extracting words and phrases from an electronic publication automatically in accordance with a token analytical program;

program means for extracting the positions of words and phrases on said electronic publication at the time of the extracting by said word and phrase extracting means;

program means for receiving an indexing object extraction condition inputted by a user; and program means for registering words and phrases relevant to said indexing object extraction condition among said extracted words and phrases in an index candidate dictionary.

6. A computer-readable recording medium for implementing automatically indexing for electronic document files, comprising:

program means for extracting words and phrases from an electronic publication automatically in accordance with a token analytical program;

program means for extracting the positions of words and phrases on said electronic publication at the time of the extracting by said words and phrases extracting means;

program means for registering said extracted words and phrases and said extracted positional information in an index candidate dictionary while correlating one with another;

program means for holding an indexing object extraction condition defined by a user; and program means for extracting words and phrases relevant to said indexing extraction condition out of words and phrases registered in said index candidate dictionary.

* * * * *